United States Patent [19]
Zielenski

[11] 4,367,572
[45] Jan. 11, 1983

[54] ELASTIC CLAMPING APPARATUS

[76] Inventor: Anthony L. Zielenski, 63-42 83rd St., Middle Village, N.Y. 11379

[21] Appl. No.: 161,194

[22] Filed: Jun. 19, 1980

[51] Int. Cl.³ .............................................. F16F 1/36
[52] U.S. Cl. ......................................... 24/301; 24/371; 180/68.5; 224/42.39; 224/42.4; 267/74; 248/154; 248/503; 248/505; 410/97
[58] Field of Search ............... 24/16 R, 16 PB, 17 R, 24/17 B, 17 AP, 301, 300, 371; 224/42.39, 42.4, 178, 175; 248/154, 499, 503, 505; 267/73, 74; 180/68.5; 206/805; 428/12, 230, 231

[56] References Cited

U.S. PATENT DOCUMENTS

| | | | |
|---|---|---|---|
| 426,087 | 4/1890 | Wolkow | 24/301 |
| 620,664 | 3/1898 | Nissim | 24/17 B |
| 1,519,854 | 12/1924 | Lockwood | 24/300 |
| 2,192,946 | 3/1940 | Towner | 24/16 R X |
| 2,376,336 | 5/1945 | Brown | 248/503 X |
| 2,833,363 | 5/1958 | Henehan | 248/503 X |
| 2,919,946 | 1/1960 | Miener | 248/503 X |
| 2,991,524 | 7/1961 | Dobrikin | 267/69 X |
| 3,333,810 | 8/1967 | Schlapman | 248/503 |
| 3,420,382 | 1/1969 | McClendon | 248/499 X |
| 4,133,080 | 1/1979 | Kuk | 24/301 |

FOREIGN PATENT DOCUMENTS

| | | | |
|---|---|---|---|
| 1941821 | 3/1971 | Fed. Rep. of Germany | 428/230 |
| 2247488 | 4/1973 | Fed. Rep. of Germany | 267/69 |
| 375885 | 5/1907 | France | 428/230 |
| 1327149 | 4/1963 | France | 248/499 |
| 768231 | 2/1957 | United Kingdom | 248/499 |

*Primary Examiner*—Thomas J. Holko
*Attorney, Agent, or Firm*—Robert D. Farkas

[57] ABSTRACT

An elastic clamping apparatus utilizes an elongated rubber-like member, having a plurality of spaced apart notches disposed along the length of each opposed lateral surface. Imbedded within the length of the elastic member is a fabric-like reinforcement member which is not extensible from the tortuous path in which it occupies when the resilient elastic member is unstretched. When stretched, the reinforcement member and the elastic member both extend in length. The end of the elastic member are fitted with a plate having a hook-like end whose outer most surface is covered with a resilient rubber-like material.

10 Claims, 6 Drawing Figures

U.S. Patent   Jan. 11, 1983   4,367,572
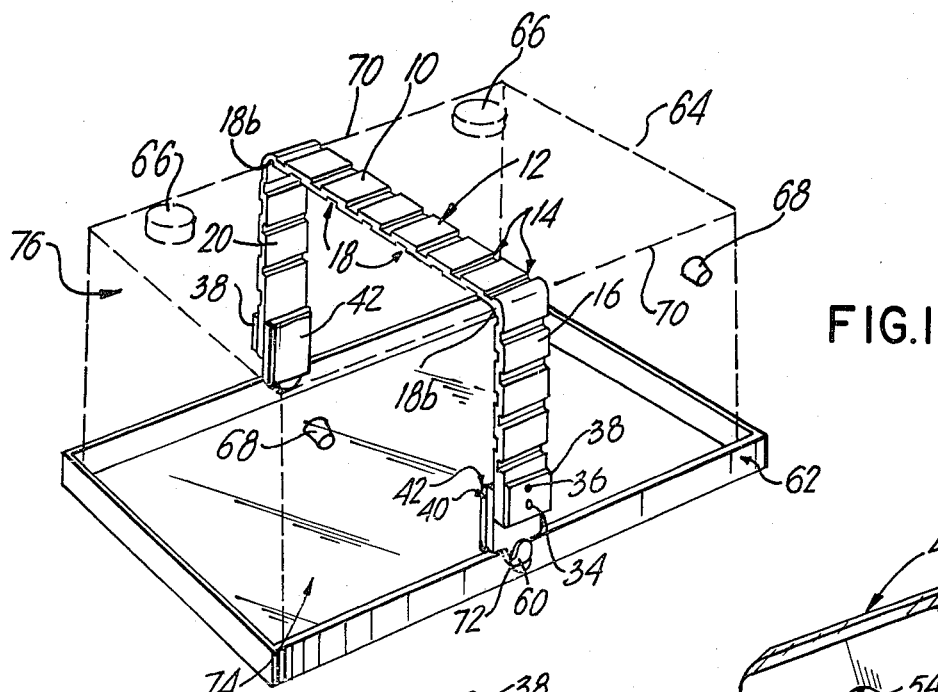
FIG.1
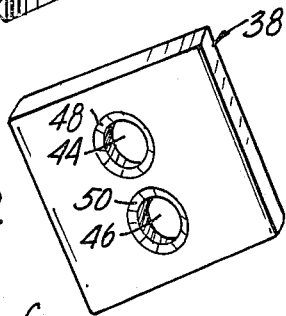
FIG.2
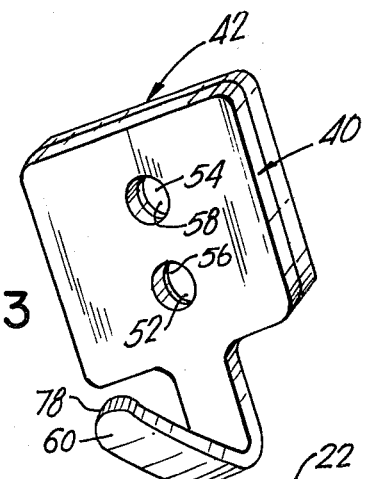
FIG.3
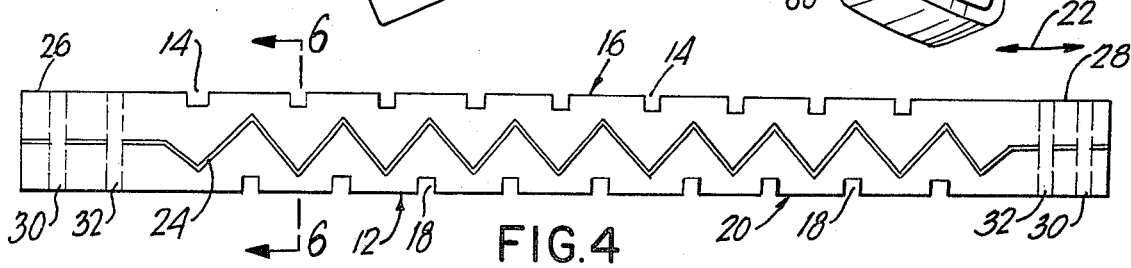
FIG.4
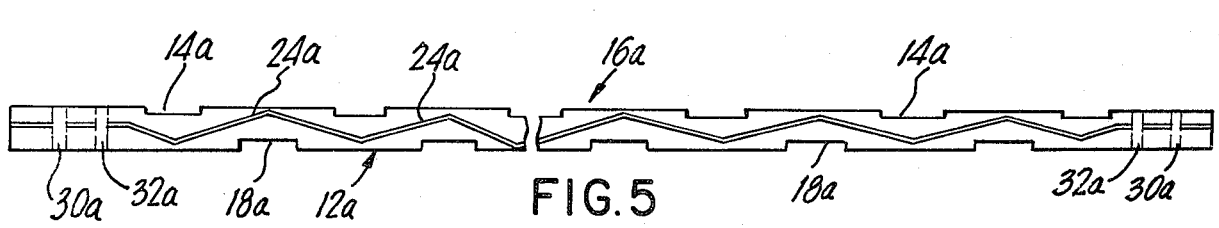
FIG.5
FIG.6

ELASTIC CLAMPING APPARATUS

BACKGROUND OF THE INVENTION

1. The Field of the Invention

This invention relates to elastic clamping apparatus, and more particularly to that class of devices useful in application as a battery tie down device.

2. Description of the Prior Art

The prior art abounds with elastic members, useful in retaining various devices, such as batteries and the like.

U.S. Pat. No. 1,519,854 issued to L. L. Lockwood on Dec. 16, 1924 teaches a wire-like device whose center portion is separated by a spring-like member and whose free ends are equipped with S-like hooks. In use, this apparatus can retain covers, batteries, or other devices, clamped into a secure position, when the spring element of Lockwood is extended. However, the Lockwood apparatus is rigid for a portion of the length thereof and fails to achieve a defined frictional engagement with the object to be secured.

United Kingdom Pat. No. 116,975 issued to H. J. Wareham on July 14, 1918, discloses an elongatable elastic-like member have a shroud-like covering disposed covering a portion of an elastic rubber-like shock cord member. The free ends of the apparatus are taught to either be equipped with I-like loops or hook-like members. Such shroud-like members are non-extensible and are provided having a greater length than the unextended elastic member, entirely covering same, when such elastic member is in an unextended condition. When extended, the shroud is stretched taut such that the length of the otherwise non-elastic shroud limits the total length in which the assembly can achieve. Thus it can be seen that the reinforcement effect of the shroud is not achieved until such time that the elastic portion of the Wareham apparatus is fully extended at which point in time, the apparatus will no longer extend since the shroud itself is non-extensible.

SUMMARY OF THE INVENTION

A primary object of the present invention is to provide an elastic clamping apparatus, primarily adapted to hold down devices, such as batteries in motor vehicles, in an effective, efficient, and economical manner.

Another object of the present invention is to provide a hold down device which engages the device to be held down such that the held down device cannot move about.

Still another object of the present invention is to provide a hold down device which is substantially entirely non-metallic thereby precluding corrosion and stress on the object to be tied down.

Yet another object of the present invention is to provide an extensible elastic member, having a reinforcement member therein, wherein such reinforcement member provides reinforcement for such extensible member regardless of the amount said extensible member is extended.

These objects as well as other objects of the present invention, will become more readily apparent after reading the following description of the accompanying drawings.

BRIEF DESCRIPTION OF THE DRAWINGS

FIG. 1 is a perspective view of the apparatus.

FIG. 2 is a perspective view of a portion of the apparatus shown in FIG. 1.

FIG. 3 is a perspective view of another portion of the apparatus shown in FIG. 1.

FIG. 4 is a cross-sectional view of a portion of still another portion of the apparatus shown in FIG. 1, in an unextended position.

FIG. 5 is a cross-sectional view of the apparatus depicted in FIG. 4, when extended.

FIG. 6 is a cross-sectional view, taken along lines 6—6, viewed in the direction of arrows 6—6, of the apparatus shown in FIG. 4.

DESCRIPTION OF THE PREFERRED EMBODIMENT

Each of the prior art teachings, particularly as they relate to battery hold down devices fails to provide an apparatus which successfully clamps the battery in a position such that the top and sides of the battery are not exposed to metals of any variety thereby increasing the possibility that otherwise fragile battery cases might crack or be subjected to contamination when such metallic hold down devices corrode. Further, the prior art does not include battery hold down devices which engage the batteries against lateral motion excepting by devices which rigidly clamp the battery against any motion. Thus, on shocks of sufficient magnitude, the upper edges of the battery case are subjected to substantial stresses. Furthermore, in a effort to limit the ability of the battery to move about, rigid clamping mechanisms are installed so that they exert a continuous force of considerable magnitude whereby preventing the battery from expanding and contracting with temperature and increasing the possibility of the battery case cracking.

The present invention contemplates the above mentioned deficiencies and takes into account the desirability of installing a battery hold down device without tools, such that the hold down device may be inexpensively manufactured, durable in life, and particularly useful for its purpose.

Broadly speaking, the present invention utilizes an extensible elastic member. Such elastic member, preferably fabricated from a rubber-like material, is provided having a rectangular cross section whose opposed lateral surfaces are equipped with a plurality of spaced apart notches. Such notches are useful in permitting the extensible rubber-like member to be extended and to grasp the corners of a battery such that the battery may not easily move about. The interior of the extensible rubber-like member is provided having a non-extensible fabric-like member installed therein so as to be completely encapsulated by the rubber-like material. The reinforcing member is disposed having a tortous pad, preferably in the form of a saw tooth configuration, extending along the length of the entire extensible member. When extended, the rubber-like material of the extensible member will stretch and the reinforcement member will assume a shape though still saw tooth in character, more nearly straightened out. The ends of the extensible member are provided with holes suitable for engaging, such as by rivets, a plate having a hook-like member secured thereto. An outermost surface of the plate, adapted with a rubber-like face, is provided to engage the walls of the battery, thereby protecting such walls from corrosion and the placement of such metallic plate. Another plate, if desired, may be utilized to clamp the ends of the extensible member to the plate having the hook-like end. In use, the hook-like ends, dispose on each free end of the extensible members, are engaged within holes in a battery supporting pan. The rubber-like face of the hook equipped member is positioned against the walls of the battery whilst the surface of the extensible member engaging the side walls and top of the battery have a pair of the notches disposed therein positioned so as to engage the edges of the battery top, thereby effectively clamping the battery against all motion, whilst keeping the battery seated within the supporting pan.

Now referring to the figures, and more particularly to the embodiment illustrated in FIG. 1 showing the present invention 10 utilizing an elastic member 12. Such elastic member is provided with notches 14, shown disposed in spaced apart relationship on surface 16 of elastic member 12. Notches 18 are shown located in surface 20 of elastic member 12. Elastic member 12, being rubber-like material, may be fabricated from a synthetic or a rubber, so as to be extensible in the direction shown by arrows 22. Reinforcement member 24 is shown residing within elastic member 12 but extending to ends 26 and 28 of such member. Reinforcement member 24 may be fabric-like, and is preferably fabricated from a plastic material, in film-like form, such as a polyamide, being flexible but non-elastic in nature. As shown in FIG. 4, reinforcement member 24 is shown having a saw-tooth configuration, when elastic member 12 is not extended. As shown in FIG. 5, reinforcement member 24A is shown having a saw-tooth configuration, of a more flattened shape, than as is shown in FIG. 4. This is due to elastic member 12A being extended as compared to elastic member 12, when shown in FIG. 4. It should be noted that notches 14A and 18A have a greater width than notches 14 and 18. Holes 30 and 32 are shown extending through elastic members 12, in FIG. 4. Holes 30A and 32A are the equivalent holes for elastic member 12A, as shown in FIG. 5. Holes 30 and 32 (as well as holes 30A and 32A) are useful in retaining rivets 34 and 36 therein. Rivets 34 and 36 pass through plates 38, and plate 40, so as to secure plates 38 and 40, in sandwich-like fashion, about ends 26 and 28 of elastic member 12. Plates 38 and 40 may be metallic, such as made of steel, if desired. Alternatively, plates 38 and 40 may be made of a rigid plastic material, such as polypropylene. Rivets 34 and 36 may be of a similar plastic or of a similar metal, as desired. Sheet 42 is shown adhered to a lateral surface of plate 40, and is fabricated from a rubber-like material, such as a natural or a synthetic rubber. Holes 44 and 46 are provided with chamfers 48 and 50 respectively, in plate 38. Holes 52 and 54 are provided with chamfers 56 and 58 respectively, in plate 40. Holes 44 and 46, as well as holes 52 and 54 are useful permitting rivets 34 and 36 to pass therethrough whilst chamfers 48, 50, 56, and 58 permits such rivets to be flattened and to effectively clamp plates 38 and 40 to ends 26 and 28 of elongatable member 12. Hook-like end 60 is provided extending outwardly, and forming an integral part of plate 40. Such hook-like end is shown extending oppositely directed from the surface of plate 40 which supports rubber-like sheet 42.

Tray 62 is shown supporting a battery, depicted by dotted lines 64. Battery terminals are depicted by dotted lines 66. For side terminal equipped batteries, dotted lines 68 depict side located terminals. As can be seen in FIG. 1, notches 18B are shown residing about dotted lines 70. Dotted lines 70 depict corner edges of the battery shown by dotted lines 64. Hole 72, shown in battery pan 62 permits hook-like end 60 to pass therethrough. As can be seen, rubber-like sheet 42 engages side wall 74 of battery 76 whilst surface 20 of extensible rubber-like member 12, communicates with other portions of the surfaces of battery 76. Rubber-like sheets 42 tend to center battery 76 within pan 62 thereby preventing battery 76 from damage near the base regions thereof. Notches 14 are useful for installations, not shown, for batteries or the like, wherein surface 16 would reside against the object or battery to be clamped and wherein hook-like ends 60 would be engaged to a supporting structure having end 78 thereof disposed adjacent the apparatus or battery to be clamped.

One of the advantages of the present invention is an elastic clamping apparatus, primarily adapted to hold down devices, such as batteries in motor vehicles, in an effective, efficient, and economical manner.

Another advantage of the present invention is a hold down device which engages the device to be held down such that the held down device cannot move about.

Still another advantage of the present invention is a hold down device which is substantially entirely non-metallic thereby precluding corrosion and stress on the object to be tied down.

Yet another advantage of the present invention is an extensible elastic member, having a reinforcement member therein, wherein such reinforcement member provides reinforcement for such extensible member regardless of the amount said extensible member is extended.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. An elastic clamping apparatus comprising an elongated resilient member, said elongated member having a lateral surface thereof including a plurality of spaced apart notches, said spaced apart notches extending transverse to the longitudinal axis of said extensible member, an elongated fabric-like reinforcement member, said fabric-like reinforcement member being disposed having a saw-tooth configuration entirely within said extensible member, said fabric-like member residing in a saw-tooth course imbedded within said extensible member and extending substantially along said longitudinal axis of said extensible member, said extensible member having a pair of free ends, said free ends of said fabric-like member secured to said pair of free ends of said elongated resilient member, each of said free ends having means to removeably secure said each of said free ends to a supporting structure, means to change the amplitude of said saw-tooth configuration when said free ends are forceably displaced away from each other.

2. The apparatus as claimed in claim 1 wherein said means to removeably secure comprises a plate, said plate having a hook-like end, said plate being fixedly secured to said each of said free ends.

3. The apparatus as claimed in claim 2 further comprising a resilient sheet, said resilient sheet being fixedly secured to a lateral surface of said plate.

4. The apparatus as claimed in claim 2 further comprising another plate, said another plate fixedly secured to said plate, wherein said plate and said another plate are disposed in clamping relationship on opposed lateral surfaces of said extensible member.

5. The apparatus as claimed in claim 4 wherein further comprising at least one rivet, said rivet being fixedly secured to said plate, said another plate, and said extensible member.

6. The apparatus as claimed in claim 5 further comprising said rivet passing through a hole disposed in said reinforcement member.

7. The apparatus as claimed in claim 1 wherein said extensible member comprises a rubber-like material.

8. The apparatus as claimed in claim 1 wherein said reinforcement member comprises a plastic material.

9. The apparatus as claimed in claim 8 wherein said plastic material comprises polyamide.

10. The apparatus as claimed in claim 1 wherein said extensible member comprises another lateral surface, said another lateral surface being opposed to said lateral surface, said another lateral surface having another plurality of spaced apart parallel notches disposed therein, wherein said another plurality of notches are disposed extending transverse to said longitudinal axis.

* * * * *